United States Patent

Sasabe

[15] 3,676,862

[45] July 11, 1972

[54] SIGNAL CONVERSION SYSTEM WITH TIME BASE COMPRESSION OF THE INPUT DATA

[72] Inventor: Kaoru Sasabe, Ikeda, Japan

[73] Assignee: Matsushita Electric Industrial Co., Ltd., Osaka, Japan

[22] Filed: June 30, 1971

[21] Appl. No.: 158,514

Related U.S. Application Data

[63] Continuation of Ser. No. 740,348, June 26, 1968, abandoned.

[30] Foreign Application Priority Data

June 30, 1967 Japan....................................42/42714

[52] U.S. Cl..........................340/172.5, 178/5.6, 179/15 BY, 307/221

[51] Int. Cl...........................................................G06f 5/06

[58] Field of Search.............................178/5.6, 5.8 R, 5.8 A; 340/172.5; 307/221; 179/15 T, 15 AP, 15 BY, 15 BV

[56] References Cited

UNITED STATES PATENTS

| | | | |
|---|---|---|---|
| 2,686,220 | 8/1954 | Sziklai et al. | 178/5.6 |
| 3,051,929 | 8/1962 | Smith | 340/172.5 |
| 3,093,796 | 6/1963 | Westerfield | 179/15.55 |
| 3,202,764 | 8/1965 | Adams et al. | 179/15.55 |

*Primary Examiner*—Robert L. Griffin
*Assistant Examiner*—Donald E. Stout
*Attorney*—Stevens, Davis, Miller & Mosher

[57] ABSTRACT

A signal conversion system in which coded signal pulses to be transmitted to a remote place, for example, pulses of coded facsimile signal, are stored in at least one shift register in synchronization with clock pulses and said signal pulses stored in the shift register are let out by quickening the shift cycle of the shift register when a predetermined number of said signal pulses have been entered in the shift register, thereby providing compressed and discrete sequences of signal pulses which can be put in, for example, the horizontal or the vertical flyback interval of a television signal to be transmitted through the latter's transmission channel.

3 Claims, 13 Drawing Figures

INVENTOR
KAORU SASABE
BY Stevens, Davis, Miller & Mosher
ATTORNEYS

INVENTOR
KAORU SASABE

BY Stevens, Davis, Miller & Mosher

ATTORNEYS

Patented July 11, 1972 3,676,862

4 Sheets-Sheet 3

INVENTOR

KAORU SASABE

BY

ATTORNEYS

Patented July 11, 1972

3,676,862

4 Sheets-Sheet 4

INVENTOR

KAORU SASABE

BY

ATTORNEYS

SIGNAL CONVERSION SYSTEM WITH TIME BASE COMPRESSION OF THE INPUT DATA

This application is a continuation of application Ser. Number 740,348 now abandoned.

This invention relates to a signal conversion system, particularly to a system in which substantially continuous informations such as a facsimile signal are first encoded into a sequence of pulse codes and then compressed in the time base and separated into groups of the pulses. According to this invention, for example, a facsimile information is transmitted being superimposed on a television signal in such manner that the continuous facsimile signal is inserted into the horizontal flyback intervals of the video signal after being compressed and splitted in the time base.

Figure 1:
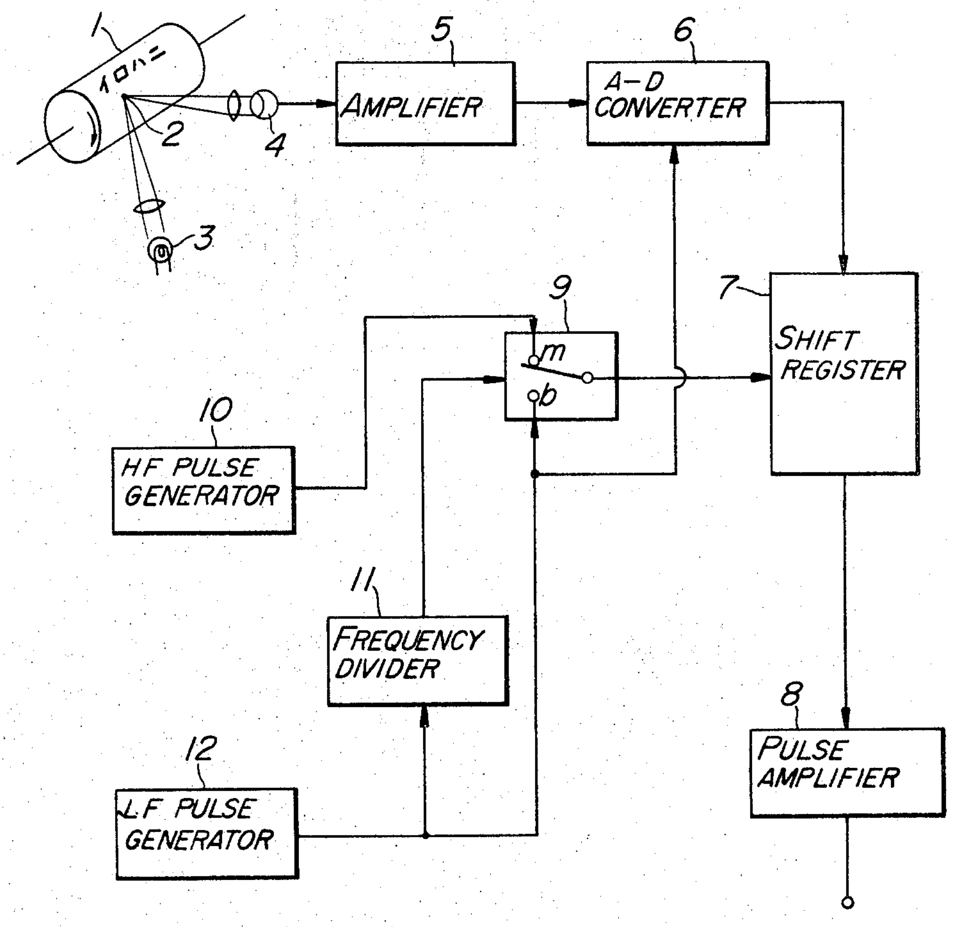
Figure 3:
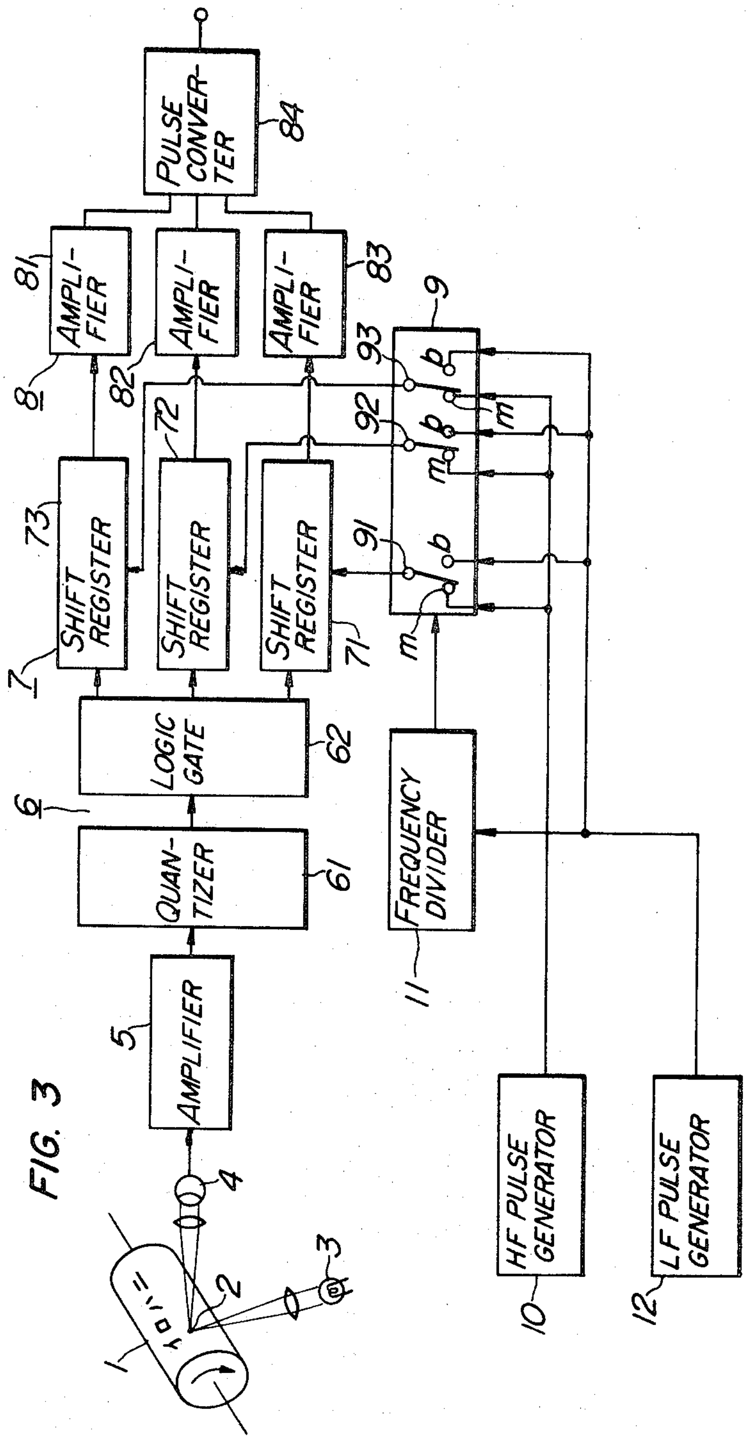

This invention will be explained in connection with am embodiment of the invention referring to the attached drawings, in which, FIG. 1 is a block diagram of an embodiment of this invention;

FIGS. 2*a*, 2*b*, 2*c*, 2*d*, 2*e* and 2*f* are diagrams for explaining the operation of the system shown in FIG. 1;

FIG. 3 is a block diagram of another embodiment of this invention; and

FIGS. 4*a*, 4*b*, 4*c*, 4*d* and 4*e* are diagrams for explaining the operation of the system shown in FIG. 3.

Referring to FIG. 1, reference numeral 1 indicates an image to be transmitted which is attached around a drum rotated at a constant speed, 2 a spot of light focused on the plane of said image originating from a light source 3, numeral 4 a photoelectric transducer for converting the light from said light spot 2 to an electric current, 5 an amplifier for amplifying the electric signal from said transducer 4, numeral 6 an A–D (analogue-digital) converter for converting output of said amplifier 5 to a digital signal, that is, coded pulses, 7 a shift register for storing and shifting a predetermined number of said coded signals from said A–D converter 6, and numeral 8 a pulse amplifier. Further, numeral 9 indicates a switch means for choosing between two sets of shift pulses for said shift register 7, numeral 10 a high frequency pulse generator for sweeping out in a high speed the pulses stored in said shift register 7, and 12 a low frequency pulse generator for supplying timing pulses to said A–D converter 6 and also for shifting said shift register 7 to store said A–D converted pulses. Numeral 11 a frequency divider for dividing frequency of the pulse from said low frequency pulse generator 12 and controlling the operation of switch means 9.

Figure 2:
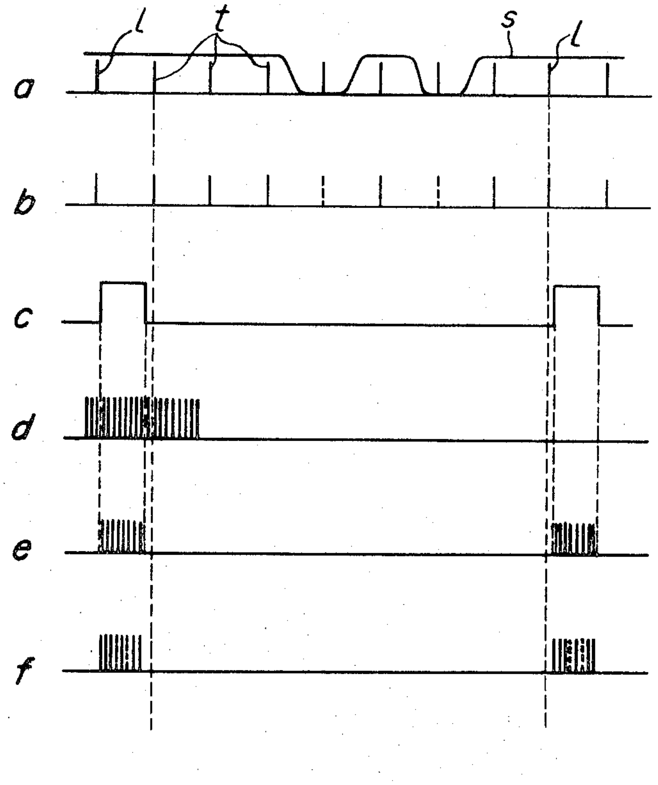

In the above-described arrangement, the A–D converter 6 converts the output (s in FIG. 2*a*) from said amplifier 5 to a pulse sequence as shown in FIG. 2*b* with a period determined by the frequency of said low frequency pulse generator 12.

Now, assuming that the number of the coded pulses to be grouped and compressed as mentioned previously has been chosen to be eight digits, this number of the signal pulses shown in FIG. 2*b* are stored into the shift register 7 in synchronization to the output (*t* in FIG. 2*a*) of the pulse generator 12, the switch means 9 closing the contact *b* and opening the contact m during this period. This operation of the switch means 9 is achieved by dividing the frequency of the output from the LF pulse generator 12 to one eighth and making pulse width of the resultant pulse a little narrower than the pulse interval of the original pulse, as shown in FIG. 2*c* and then providing this pulse to the switch means 9 to close the contact m only during existence of this pulse. On the other hand, frequency of the output (FIG. 2*d*) from the HF pulse generator 10 is chosen to be sufficiently high so that the high frequency pulses corresponding to eight digits are easily contained within the pulse width of said switch operating pulse as shown in FIG. 2*c*. Thus, when the shift register 7 has been filled and the contact *m* of the switch means 9 has been closed to apply the pulsed output (FIG. 2*d*) of the HF pulse generator 10 to the shift register 7 during existence of the pulse shown in FIG. 2*c*, the shift register 7 is shifted in synchronization with the higher frequency pulses as shown in FIG. 2*e*; that is, the shift register 7 is swept out in a high speed after the last pulse (*l* in FIG. 2*a*) of the eight digits has been stored and before the first pulse of the ensuing eight digits comes in. As the result, pulses as shown in FIG. 2*b* corresponding to eight digits are compressed to a densely packed sequence of pulses as shown in FIG. 2*f*.

Therefore, the space between two groups of pulses as shown in FIG. 2*f* can be utilized by another signal, for example, by television signal. In other words, the compressed signals obtained according to this invention can be interspersed in a television signal; more practically, they are put in the television signal at the starting or end portion of each horizontal sweep. Thus, according to this invention, a facsimile information as shown by reference numeral 1 in FIG. 1 can be transmitted together with a television signal utilizing the video channel.

Next, another embodiment of this invention will be explained referring to FIG. 3, in which units indicated by reference numerals 1 to 12 are the same in the functions as those indicated by the corresponding numerals in FIG. 1.

Figure 4:
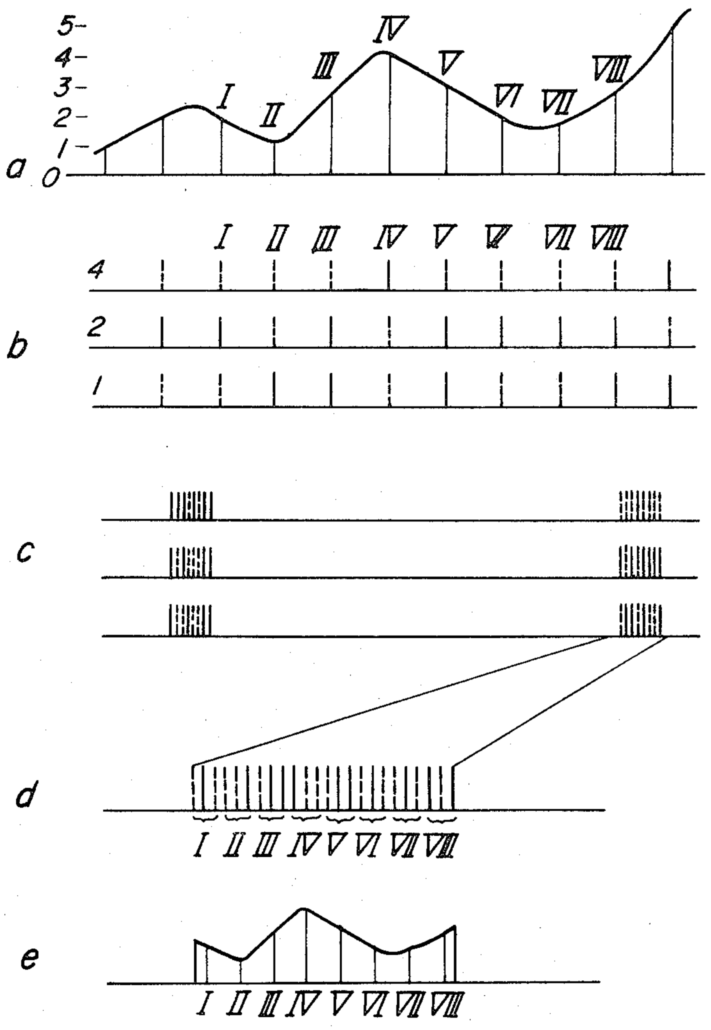

The A–D converter 6 consists of a quantizer 61 and a logic gate 62. In the quantizer 61 which is a known device including voltage comparators, facsimile signal from the amplifier 5 is separated into discrete parts according to the level at each sampling point, that is, in synchronization with the low frequency pulse, as shown in FIG. 4*a*. The output from the quantizer 61 is converted to coded pulses according to the level as shown in FIG. 4*b*.

The shift register 7 consists of a plurality of similar units 71, 72, 73, the number of the units being determined by number of bits of said coded pulses (three, in this embodiment), and the respective units 71, 72, 73 all concurrently shift the binary coded outputs of the logic gate 62 respectively representing digits "1", "2" and "4". Amplifiers 81, 82 and 83 are connected respectively to the shift registers 71, 72 and 73. Outputs from the amplifiers 81, 82 and 83, respectively representing digits "1", "2" and "4" and appearing concurrently, are successively put in a single sequence of pulses through a pulse converter 84 which includes registers.

Namely, in this embodiment, output pulses of the A–D converter 6, respectively representing digits "1", "2" and "4" as shown in FIG. 4b, are stored in the respective shift registers 71, 72 and 73 synchronizing to the output pulses (t in FIG. 2*a*) of the low frequency pulse generator (12) as previously described in connection with the first embodiment. The stored pulses, when the registers have been filled to the brim, are rapidly swept out synchronizing to the output pulses (FIG. 2*e*) of the high frequency pulse generator 10, thereby being compressed into a small time interval as shown in FIG. 4*c*. The outputs of the shift registers 71, 72 and 73 are supplied to the pulse converter 84, respectively through the amplifiers 81, 82 and 83, each pulse from the three shift registers concurrently coming into the pulse converter 84, where the pulses are successively put in a single sequence of coded pulses as shown in FIG. 4*d*. Alternatively, the outputs of the shift registers 71, 72 and 73 are reconverted to an analogue signal as shown in FIG. 4e which is a compressed version of the original signal shown in FIG. 4*a*. In this alternative case, a D–A converter is used instead of the pulse converter 84. It will be noted that in FIGS. 4*d* and 4*e*, the same time interval as that for each sequence of pulses in FIG. 4*c* is shown in an enlarged time base.

As described above, according to this invention in which coded signal pulses are stored in at least one shift register in synchronization with periodic reference pulses and the stored signal pulses are let out within a period shorter than one pulse interval of said reference pulses by quickening the shift cycle when a predetermined number of said signal pulses are stored in said shift register, thus providing compressed sequence of signal pulses; an information signal such as a facsimile signal can be transmitted together with a television signal without causing any harm, by compressing said information signal as described above and putting each of the discrete and compressed portions of said information signal into the horizontal or vertical flyback intervals of the television signal. At the receiving end, this intermittent compressed signal is separated from the television signal and is expanded to the original length, and the original facsimile signal is reproduced through appropriate means which may include similar shift registers.

What is claimed is:

1. A signal conversion device, comprising:

generating means for generating an analogue signal;

converting means for converting said analogue signal into a digital signal having a plurality of digits;

shift register means for storing and shifting a predetermined number of digits comprising said digital signal;

low frequency generating means for generating a series of pulses of a first frequency;

high frequency generating means for generating a series of pulses of a second frequency which is higher than said first frequency;

switching means for selectively connecting the outputs of said low frequency generating means and said high frequency generating means to said shift register means to control the shift speed of said shift register means;

frequency divider means connected between the output of said low frequency generating means and said switching means for dividing the frequency of the output of said low frequency generating means and controlling the switching operation of said switching means; and means connecting the output of said low frequency generating means to said converting means to control the rate at which said converting means converts said analogue signal into said digital signal.

2. A signal conversion device as defined in claim 1, wherein:

said shift register means comprises a plurality of shift register means; and said converting means comprises quantizer means for sampling said analogue signal in synchronism with said first frequency and separating the sampled signal into a plurality of discrete parts according to the amplitude of each sampled signal and logic gate means connected to the output of said quantizer means for applying each of said discrete parts to a corresponding one of said plurality of shift register means.

3. A signal conversion means as defined in claim 2, further comprising:

pulse converting means connected to the output of said plurality of shift register means for producing an analogue signal having a single sequence of pulses composed of the successive outputs of each of said plurality of shift register means.

* * * * *